(12) United States Patent
Suk et al.

(10) Patent No.: US 8,755,624 B2
(45) Date of Patent: Jun. 17, 2014

(54) IMAGE REGISTRATION DEVICE AND METHOD THEREOF

(75) Inventors: Jung Hee Suk, Daejeon (KR); Sanghun Yoon, Daejeon (KR); Chun-Gi Lyuh, Daejeon (KR); Ik Jae Chun, Daejeon (KR); Tae Moon Roh, Daejeon (KR)

(73) Assignee: Electronics & Telecommunications Research Institute, Daejeon (KR)

( * ) Notice: Subject to any disclaimer, the term of this patent is extended or adjusted under 35 U.S.C. 154(b) by 149 days.

(21) Appl. No.: 13/585,726

(22) Filed: Aug. 14, 2012

(65) Prior Publication Data

US 2013/0156336 A1    Jun. 20, 2013

(30) Foreign Application Priority Data

Dec. 15, 2011  (KR) .......... 10-2011-0135208

(51) Int. Cl.
*G06K 9/40* (2006.01)
(52) U.S. Cl.
USPC ........................................... 382/255
(58) Field of Classification Search
None
See application file for complete search history.

(56) References Cited

U.S. PATENT DOCUMENTS

| | | | |
|---|---|---|---|
| 6,895,106 B2* | 5/2005 | Wang et al. .................. 382/132 |
| 7,936,384 B2* | 5/2011 | Sawachi ..................... 348/240.1 |
| 8,401,276 B1* | 3/2013 | Choe et al. ................... 382/154 |
| 2003/0040815 A1* | 2/2003 | Pavlidis .......................... 700/48 |
| 2009/0231436 A1* | 9/2009 | Faltesek et al. .............. 348/169 |
| 2011/0025829 A1* | 2/2011 | McNamer et al. ............. 348/50 |
| 2011/0092762 A1* | 4/2011 | Wong et al. .................... 600/34 |
| 2011/0158509 A1* | 6/2011 | Li et al. ........................ 382/154 |

FOREIGN PATENT DOCUMENTS

| KR | 1020050063991 A | 6/2005 |
|---|---|---|
| KR | 1020080054094 A | 6/2008 |
| KR | 1020090109437 A | 10/2009 |

OTHER PUBLICATIONS

Wu et al., "An improved RANSAC homography algorithm for feature based image mosaic," Proceedings of the 7th WSEAS International Conference on Signal Processing, Computational Geometry & Artificial Vision, 2007.*
Khare et al., "Precise Image Registration and Occlusion Labeling", Proceedings of the IEEE 2010 National Aerospace and Electronics Conference (NAECON), Fairborn, OH, Jul. 14-16, 2010, pp. 132-135.*

* cited by examiner

*Primary Examiner* — Bhavesh Mehta
*Assistant Examiner* — Feng Niu (57) ABSTRACT

Disclosed is an image registration device which includes an image input unit which receives an image; an image information generating unit which generates a homography matrix from the input image; and a warping unit which registers an image based on the homography matrix. The registration information generating unit comprises a distance information generator which generates distance information on subjects of the input image; a distance information modeler which approximates the generated distance information; an overlap information generator which generates overlap information from the approximated distance information; a matching pair determiner which determines a matching pair from the overlap information; and a homography matrix generator which generates a homography matrix from the matching pair.

9 Claims, 12 Drawing Sheets

IMAGE REGISTRATION DEVICE AND METHOD THEREOF

CROSS-REFERENCE TO RELATED APPLICATIONS

A claim for priority under 35 U.S.C. §119 is made to Korean Patent Application No. 10-2011-0135208 filed Dec. 15, 2011, in the Korean Intellectual Property Office, the entire contents of which are hereby incorporated by reference.

BACKGROUND

The inventive concepts described herein relate to an image registration device and a method thereof.

Image registration may be the process of transforming different sets of data into one coordinate system. With advance in an image processing technique, there may have been developed a technique to register a plurality of moving pictures, not a plurality of still images.

Image registration may be performed with respect to every frame of a moving picture to register moving pictures input from a plurality of image input devices in real time. In general, information of subjects of each image (e.g., size, direction, interval, etc.) may be varied according to an image frame. Thus, for precise image registration, a homography matrix may be newly calculated every frame. The homography matrix may be a matrix indicating transformation that one dot on a plane of an image is shifted into one dot on the same plane of another image. A time taken to calculate the homography matrix may occupy most of a time for image registration.

SUMMARY

Example embodiments of the inventive concept provide an image registration device comprising an image input unit which receives an image; an image information generating unit which generates a homography matrix from the input image; and a warping unit which registers an image based on the homography matrix. The registration information generating unit comprises a distance information generator which generates distance information on subjects of the input image; a distance information modeler which approximates the generated distance information; an overlap information generator which generates overlap information from the approximated distance information; a matching pair determiner which determines a matching pair from the overlap information; and a homography matrix generator which generates a homography matrix from the matching pair.

In example embodiments, the distance information is generated by an overlap level of the input image.

In example embodiments, the image registration device further comprises a distance measuring sensor which measures a photographing distance on subjects of the input image. The distance information is generated by the measured photographing distance.

In example embodiments, the distance information is approximated by at least one linear function.

In example embodiments, the overlap information is generated depending upon the modeled distance information and a geometric location condition of the image input unit, the geometric location condition including a separation distance and a viewing angle of the image input unit.

In example embodiments, the image registration device further comprises an image correcting unit which corrects an image registered by the warping unit.

In example embodiments, the image correcting unit corrects the registered image using a histogram method.

In example embodiments, the image correcting unit corrects the registered image using a graph cut method.

In example embodiments, the image registration device further comprises a display which outputs an image corrected by the image correcting unit.

Example embodiments of the inventive concept also provide an image registration method comprising generating distance information on subjects of input image; approximating the distance information; generating overlap information from the approximated distance information; determining a matching pair from the overlap information to generate a homography matrix; and registering an image based on the homography matrix.

In example embodiments, the distance information is generated by an overlap level of the input image.

In example embodiments, the distance information is generated by a photographing distance measured by a distance measuring sensor.

In example embodiments, the distance information is approximated by at least one linear function.

In example embodiments, the overlap information is generated depending upon the modeled distance information and a geometric location condition of the image input unit, the geometric location condition including a separation distance and a viewing angle of the image input unit.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Figure 1:
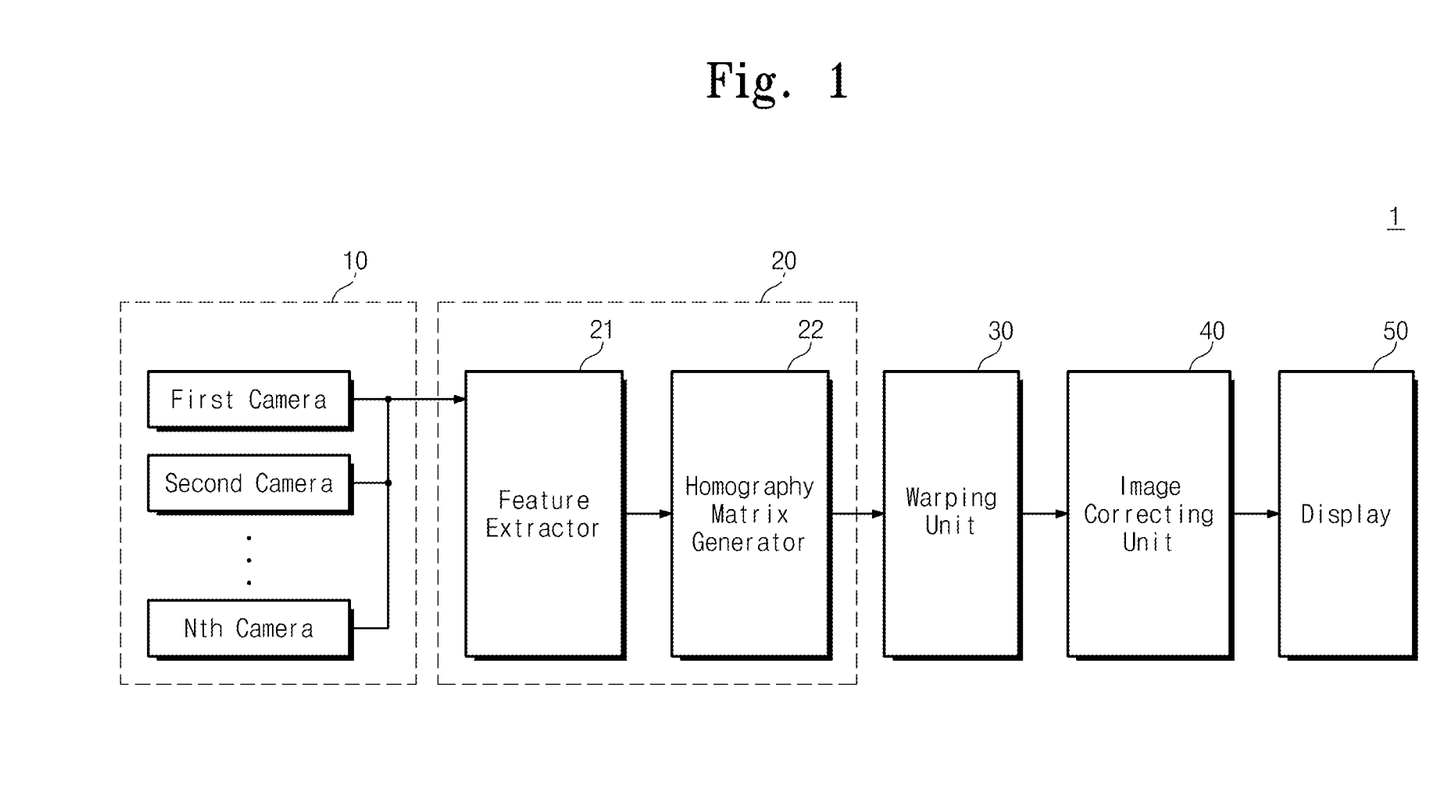
FIG. 1 is a block diagram schematically illustrating an image registration device according to an embodiment of the inventive concept.

FIG. 1 is a block diagram schematically illustrating an image registration device according to an embodiment of the inventive concept. Referring to FIG. 1, an image registration device may include an image input unit 10, a registration information generating unit 20, a feature extractor 21, a homography matrix generator 22, a warping module 30, an image correcting unit, and a display 50.

The image input unit 10 may include at least one image input device. In example embodiments, the inventive concept will be described on the basis of registration on two images input from two image input devices. In example embodiments, a camera may be used as an image input device. However, the inventive concept is not limited thereto. For example, three or more image input devices may be used. Also, a camcorder, a smart phone, and the like may be used as an image input device. An image input from the image input device 10 may be transferred to the registration information generating unit 20.

The registration information generating unit 20 may calculate information needed for image registration using an image input from the image input device 10. The registration information generating unit 20 may be formed of the feature extractor 21 and the homography matrix generator 22.

The feature extractor 21 may extract a feature point and a feature vector from an image input from the image input device 10. A feature point and a feature vector on each image may be extracted to register two different images. A feature point calculating algorithm may be implemented variously. For example, the feature point may be calculated by an SIFT (Scale Invariant Feature Transform) or KLT (Karhunen-Loeve Transform) algorithm. However, the inventive concept is not limited thereto.

When a feature point and a feature vector are extracted by the feature extractor 21, an error may arise due to distortion of an image. For example, in the even that a camera of the image input unit 10 is a wide-angle camera, an image may be distorted into a globular shape due to a viewing angle. Also, since a camera moves in a constant direction, a scale difference may arise between cameras. Thus, an error may be reduced by correcting an image before a feature point and a feature vector are extracted. The feature extractor 21 may output the extracted feature point and feature vector to the homography matrix generator 22.

The homography matrix generator 22 may generate a homography matrix using the feature point and feature vector. A reference image may be a basic image of a synthetic image. A target image may be an auxiliary image to be registered with the reference image. When two images share the same plane, a homography matrix may exist between the two images. For example, it is assumed that cameras are installed at both sides of a moving vehicle. In this case, two images input from the cameras may share a road as a plane.

The homography matrix generator 22 may match a feature point and a feature vector, closest to two images, from among feature points and feature vectors extracted by the feature extractor 21. The homography matrix generator 22 may generate a homography matrix using the matched feature point and feature vector on the basis of the shared plane. The homography matrix may be calculated by various algorithms. For example, homography matrix may be calculated by an RANSAC (RANdom SAmple Consensus) algorithm. However, the inventive concept is not limited thereto. The homography matrix generator 22 may send the homography matrix to the warping unit 30.

The warping unit 30 may generate a synthetic image by geometrically transforming an image using the homography matrix. The warping unit 30 may use a forward mapping method in which a target image is warped using the homography matrix and then the warped image synthesized with a reference image. Alternatively, the warping unit 30 may use an inverse mapping method for obtaining a location of a target image pixel corresponding to a pixel of a synthetic image.

The image correcting unit 40 may correct an image synthesized by the warping unit 30. At image synthesis, a boundary line may appear at the synthesized image due to a brightness difference between the reference image and the target image. The image correcting unit 40 may remove the boundary line through a histogram method, a Gaussian pyramid method, a laplacian pyramid method, and the like. The image correcting unit 40 may reduce a distortion caused at image synthesis by partitioning and synthesize an image using a graph cut technique.

The display 50 may output an image corrected by the image correcting unit 40. The display 50 may include an output device such as a liquid crystal display. The display 50 may be connected with external devices such as TV, a computer monitor, and the like.

As described above, the image registration device 1 according to an embodiment of the inventive concept may generate a homography matrix using a feature extracted from an image. The image registration device 1 may obtain a precise synthetic image by registering and correcting an image using a homography matrix.

A manner of generating a homography matrix through feature extracting and matching of images may have high accuracy while it requires a large calculating amount and a long calculating time. Thus, the inventive concept may be directed to provide an image registration device which generates a homography matrix with high accuracy by a less calculating amount and a short calculating time.

Figure 2:
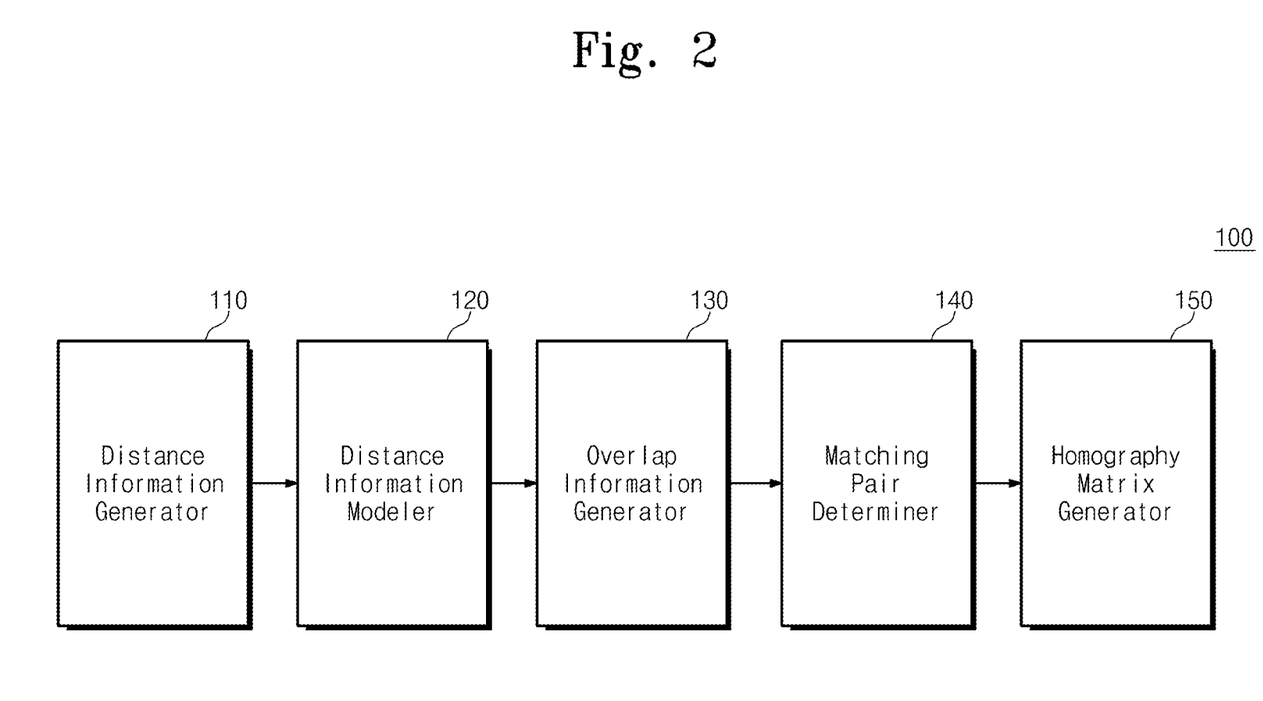
FIG. 2 is a block diagram schematically illustrating a registration information generating unit according to an embodiment of the inventive concept.

FIG. 2 is a block diagram schematically illustrating a registration information generating unit according to an embodiment of the inventive concept. Referring to FIG. 2, a registration information generating unit may include a distance information generator 110, a distance information modeler 120, an overlap information generator 130, a matching pair determiner 140, and a homography matrix generator 150.

The distance information generator 110 may generate photographing distance information of main subjects of an image. The distance information generator 110 may calculate distance information from an input image. The distance information generator 110 may receive distance information from a distance measuring sensor. A method of calculating distance information from an image will be more fully described with reference to FIGS. 3A, 3B, and 3C. The distance information generator 110 may send the generated distance information to the distance information modeler 120.

The distance information modeler 120 may map the distance information onto a geometric coordinate of an image. The distance information modeler 120 may approximate the mapped distance information. In example embodiments, linear approximation may be applied to the distance information. However, the inventive concept is not limited thereto. The distance information modeler 120 may provide the overlap information generator 130 with distance information modeled by at least one linear function through the linear approximation.

The overlap information generator 130 may generate overlap information based on distance information modeled by a linear function and a geometric location condition of an installed camera. The overlap information may be information associated with an overlapped portion shared by a reference image and a target image. A method of generating overlap information will be more fully described with reference to FIGS. 5A and 5B. The overlap information generator 130 may send the overlap information to a matching pair determiner 140.

The matching pair determiner 140 may determine a pixel pair (i.e., a matching pair), matched at a portion shared by a reference image and a target image, using the overlap information of an image. The matching pair determiner 140 may select matching pairs such that the number of matching pairs required for image registration is minimized. A method of selecting matching pairs will be more fully described with reference to FIGS. 5A and 5B.

The homography matrix generator 150 may generate a homography matrix using matching pairs selected by the matching pair determiner 140. Upon generation of the homography matrix through the homography matrix generator 150, since line approximation is applied to distance information, a less number of matching pairs may be used for calculation. Thus, both calculating time and calculating amount may be reduced by skipping a complicated algorithm such as RANSAC.

Figure 3A:
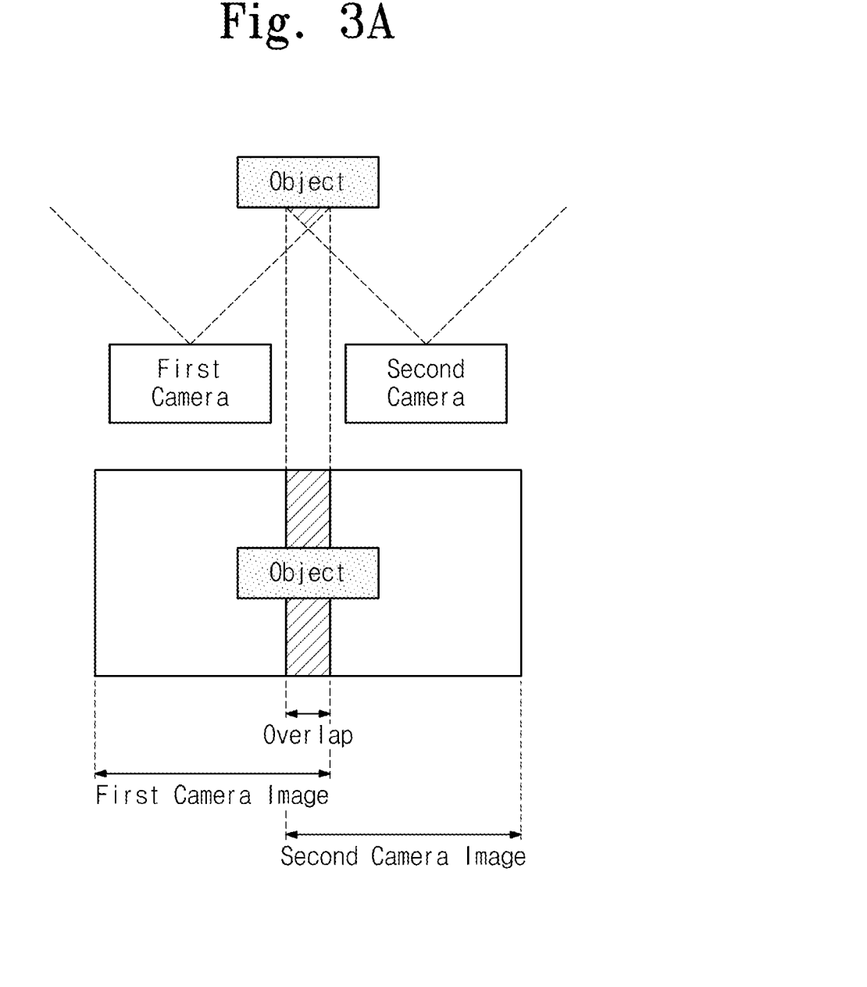
FIGS. 3A, 3B, and 3C are conceptual diagrams for describing an overlap ratio of an image according to a photographing distance of a subject.
Figure 3B:
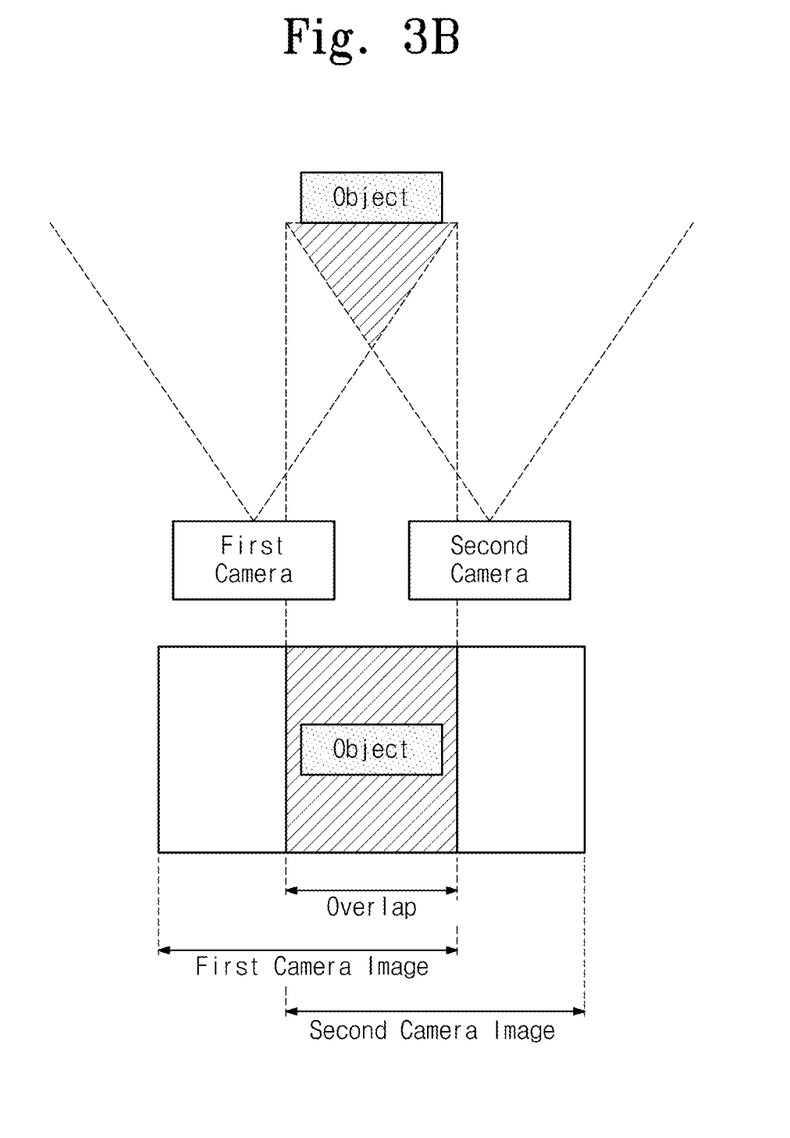
Figure 3C:
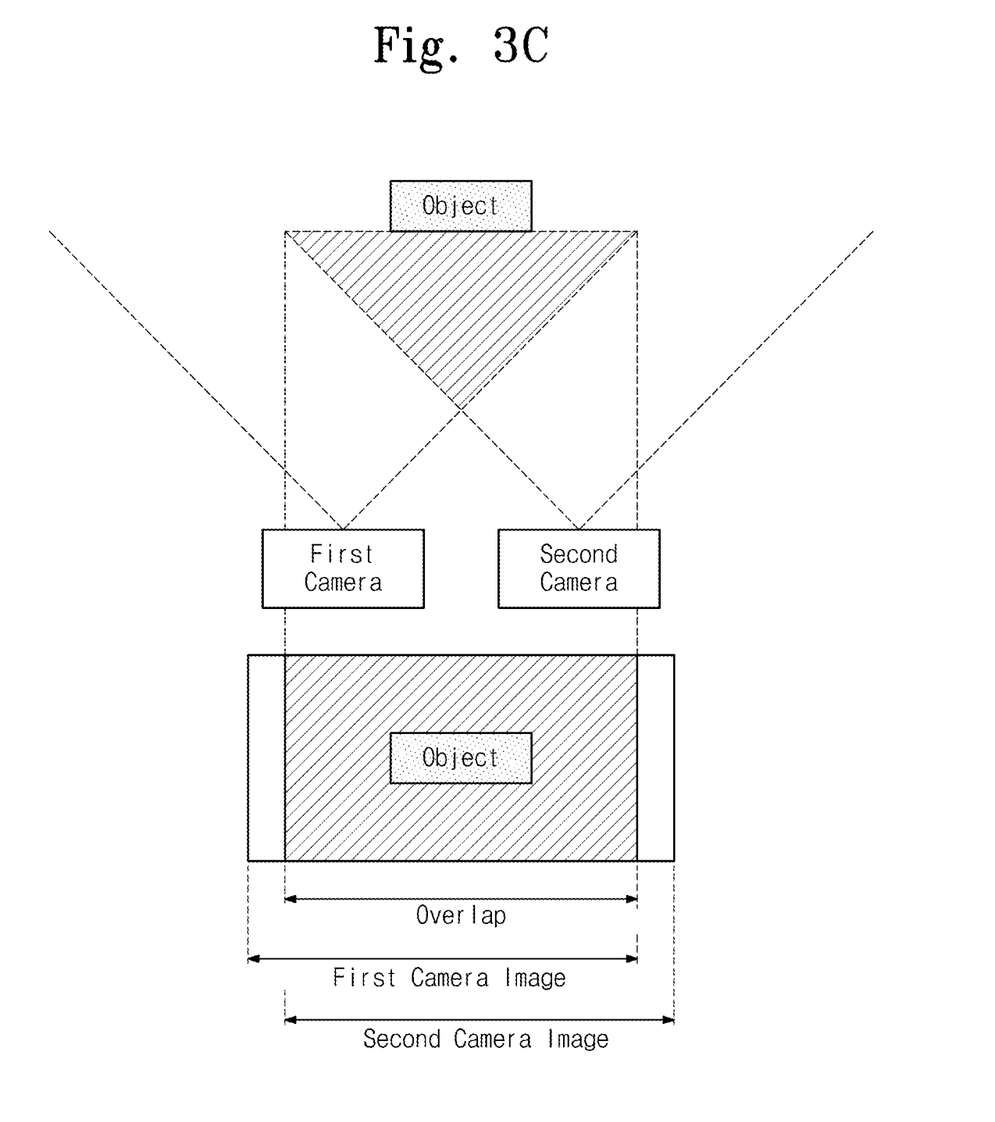

FIGS. 3A, 3B, and 3C are conceptual diagrams for describing an overlap ratio of an image according to a photographing distance of a subject. FIG. 3A illustrates the case that a subjacent is placed at a short distance, FIG. 3B illustrates the case that a subjacent is placed at a middle distance, and FIG. 3A illustrates the case that a subjacent is placed at a long distance.

Referring to FIGS. 3A, 3B, and 3C, as a photographing distance becomes shorter, an overlapped portion between images may decrease. As photographing distance becomes longer, an overlapped portion between images may increase. That is, in an image, a photographing distance of a subject may be proportional to an overlap level. Thus, if an image is taken to be overlapped using a plurality of image input devices, a photographing distance of a subject may be extracted from image information. An image input device may be a twin lens camera.

FIGS. 4A to 4F are graphs illustrating examples that distance information is modeled by linear approximation. In FIGS. 4A to 4F, a vertical axis may indicate a photographing distance, and a horizontal axis may indicate a y-axis of an image input from an image input device.

Figure 4A:
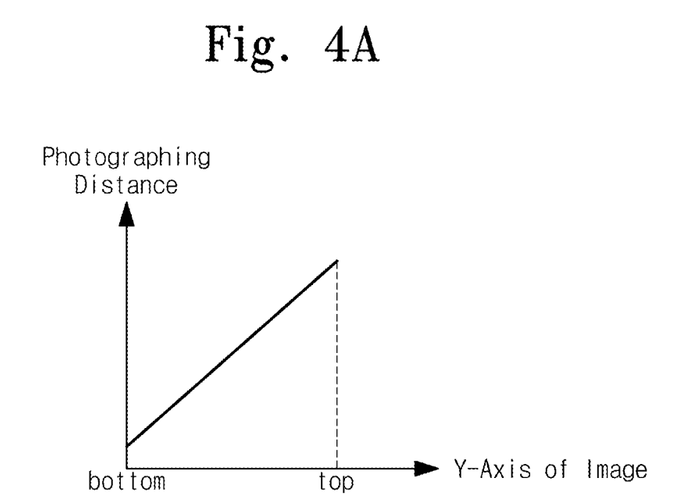
FIGS. 4A to 4F are graphs illustrating examples that distance information is modeled by linear approximation.
Figure 4B:
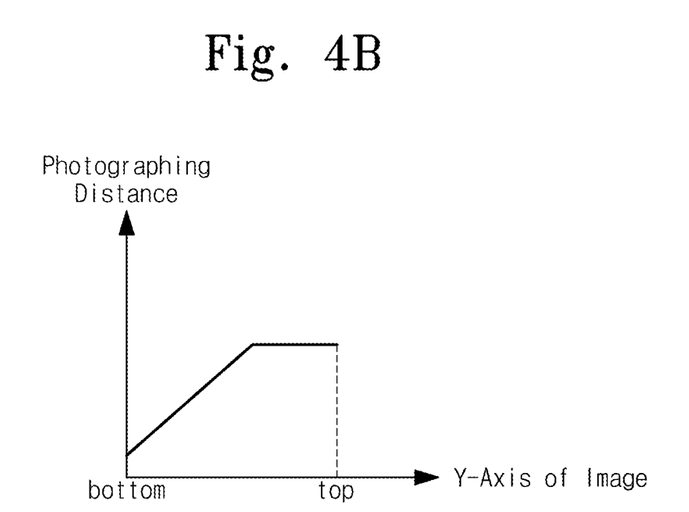
Figure 4C:
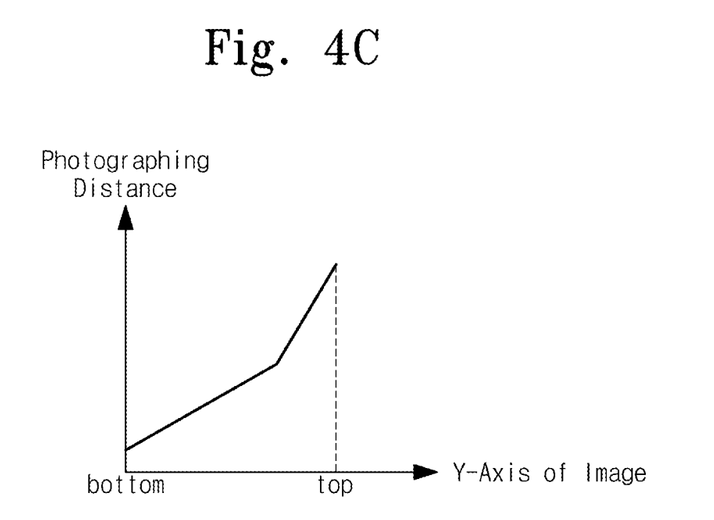
Figure 4D:
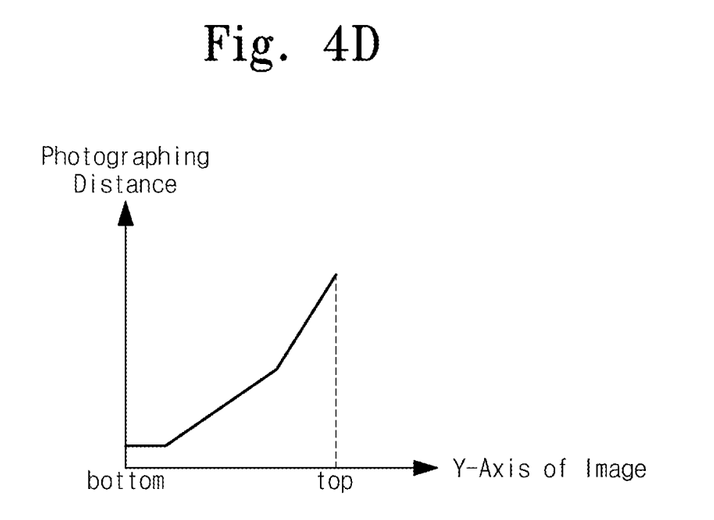
Figure 4E:
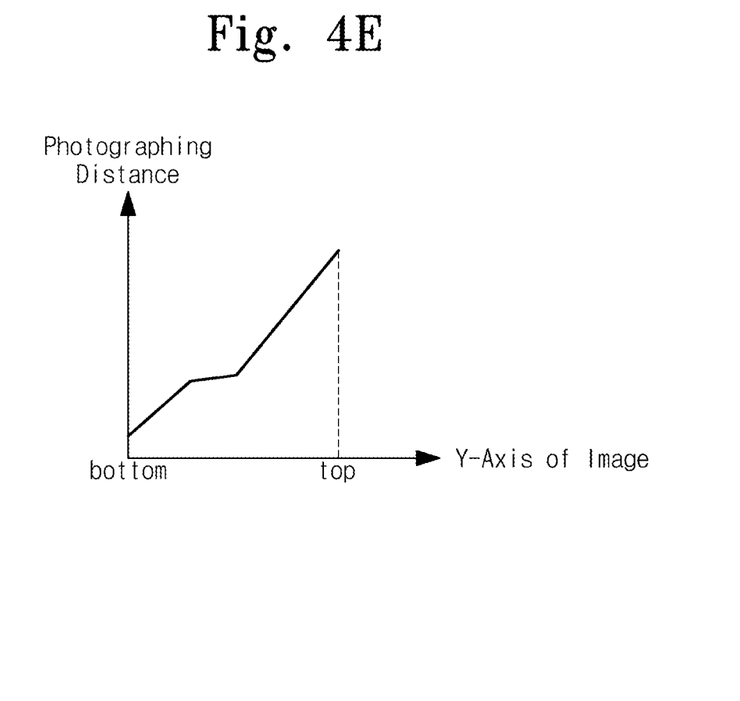
Figure 4F:
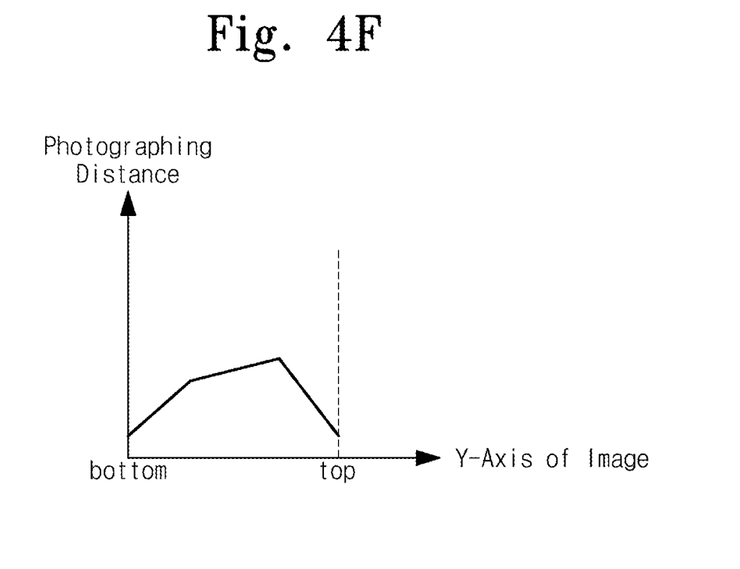

Since various subjects are included in an image, a photographing distance may vary irregularly within an image. The photographing distance may be approximated linearly by partitioning an image into a plurality of segments with respect to the y-axis. For example, FIG. 4A shows an example that distance information is expressed by one linear function. FIG. 4B shows an example that distance information is expressed by a linear function increasing and a linear function being constant.

A photographing distance may show a specific trend according to a photographing environment of a camera. For example, in the event that a camera is installed at the outside of a vehicle, an image may be taken in a horizontal direction on a ground due to a vehicle characteristic. Thus, a photographing distance of a lower portion may be closer than that of an upper portion. The photographing distance may be approximated more precisely in light of this photographing environment.

Figure 5A:
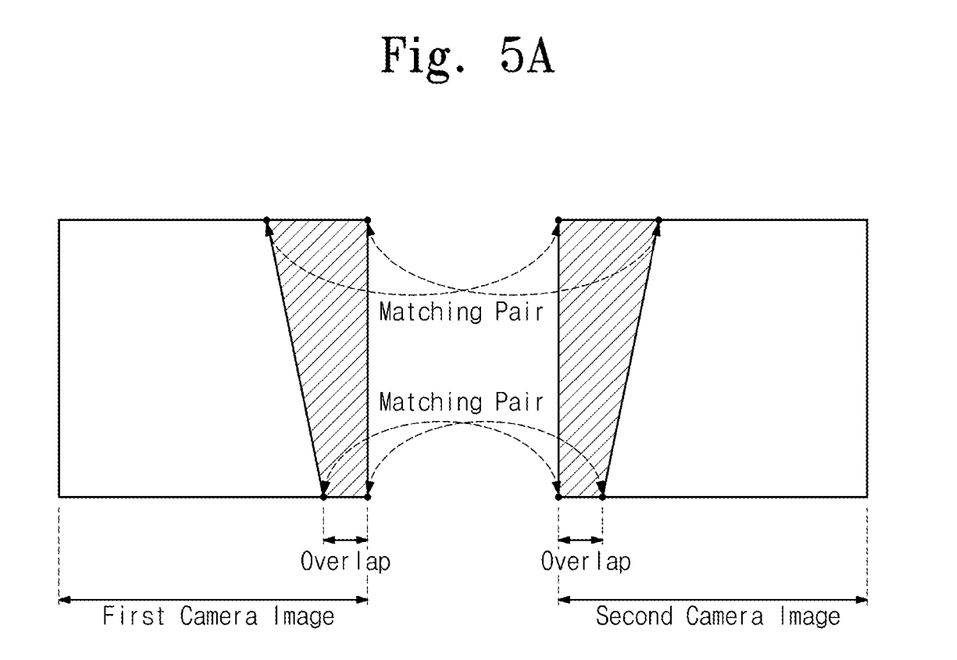
FIGS. 5A and 5B are conceptual diagrams for describing a process of determining overlap information and matching pairs of reference and target images.
Figure 5B:
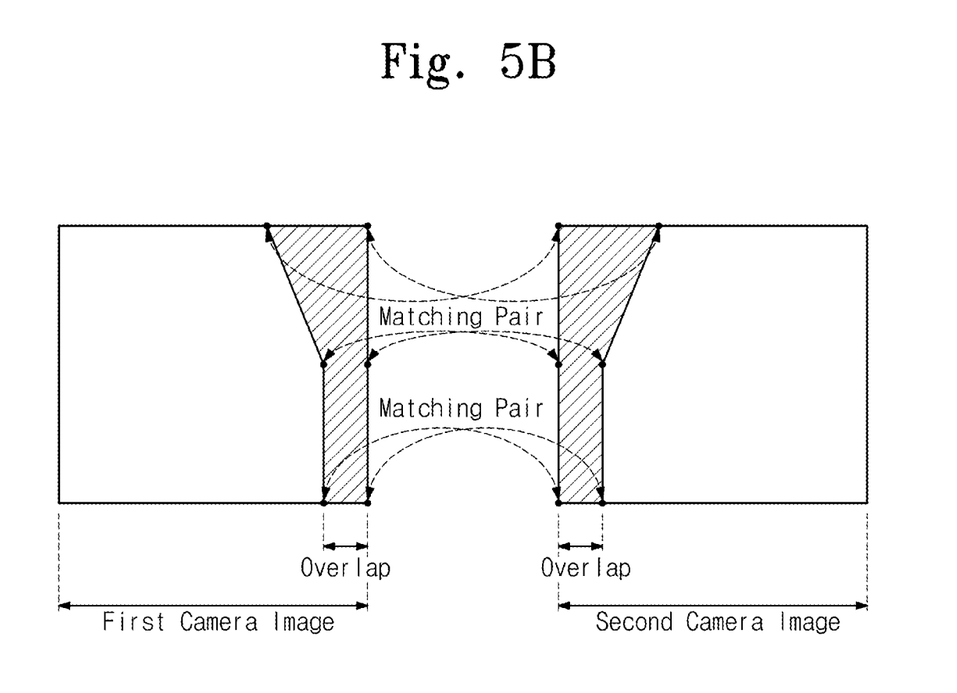

FIGS. 5A and 5B are conceptual diagrams for describing a process of determining overlap information and matching pairs of reference and target images. As described above, as a photographing distance becomes closer, an overlap interval of images may become narrower. As a photographing distance becomes longer, an overlap area of images may increase. Thus, overlap information of images may be modeled by combining distance information and geometric location information of cameras, that is, view angle and separation distance of cameras.

FIG. 5A shows an example that modeled overlap information has one liner period. Referring to FIG. 5A, it is understood from an image that a lower portion is taken at a short distance, an upper portion is taken at a long distance, and a photographing distance is linear. A matching pair may be determined to indicate overlap information using such distance information. As illustrated in FIG. 5A, when overlap information has one linear period, at least two matching pairs may be needed.

FIG. 5B shows an example that modeled overlap information has two liner periods. Referring to FIG. 5B, it is understood from an image that a lower portion is taken at a constant distance and a photographing distance increases linearly from a specific height. As illustrated in FIG. 5B, when overlap information has two linear periods, at least three matching pairs may be needed. In example embodiments, at least four matching pairs may be selected every liner period. However, the inventive concept is not limited thereto.

Figure 6:
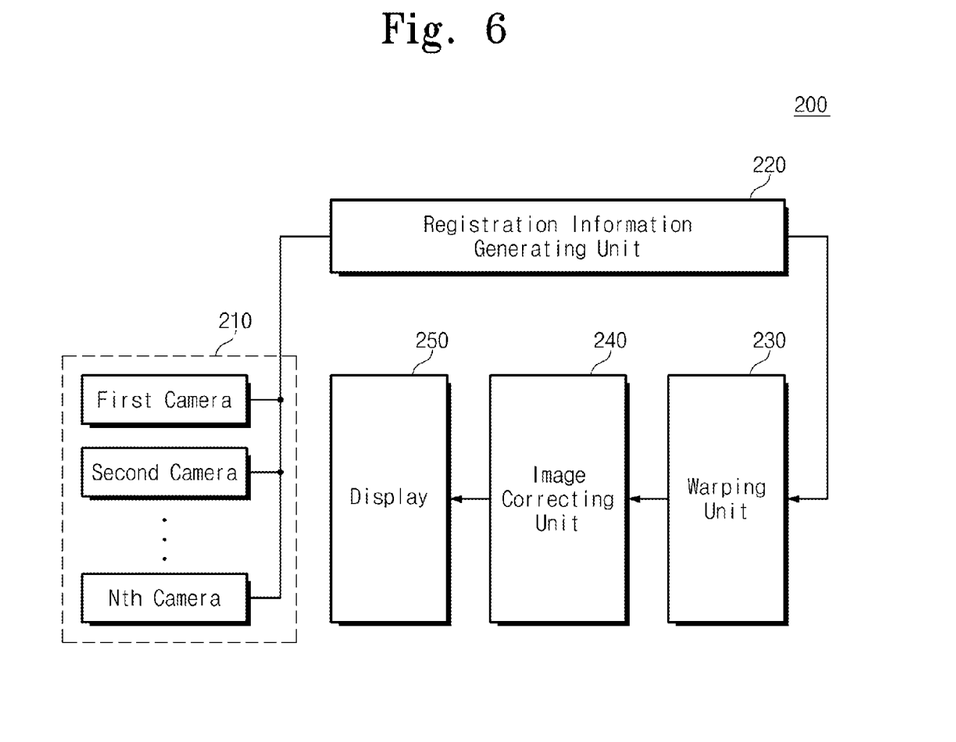
FIG. 6 is a block diagram schematically illustrating an image registration device including a registration information generating unit in FIG. 2.

FIG. 6 is a block diagram schematically illustrating an image registration device including a registration information generating unit in FIG. 2. Referring to FIG. 6, an image registration device 200 may include an image input unit 210, a registration information generating unit 220, a warping unit 230, an image correcting unit 240, and a display 250. The image registration device 200 in FIG. 6 may be analogous to that in FIG. 1 except for a registration information generating unit 220.

The registration information generating unit 220 may receive an image from the image input unit 210. The registration information generating unit 220 may calculate distance information from the input image to perform linear approximation. The registration information generating unit 220 may generate overlap information of an image through the approximated distance information. The registration information generating unit 220 may determine a matching pair through the overlap information of an image to generate a homography matrix. The registration information generating unit 220 may transfer the homography matrix to the warping unit 230.

As described above, the image registration device 200 of the inventive concept may generate overlap information of an image using distance information and location information of a camera. The image registration device 200 may easily determine a matching pair using overlap information of an image. Thus, a calculating amount may be reduced by skipping a feature point extracting operation and a feature vector generating and matching operation. Since a less amount of matching pairs is used at the image registration device 200, it is possible to reduce a time taken to calculate a homography matrix.

Figure 7:
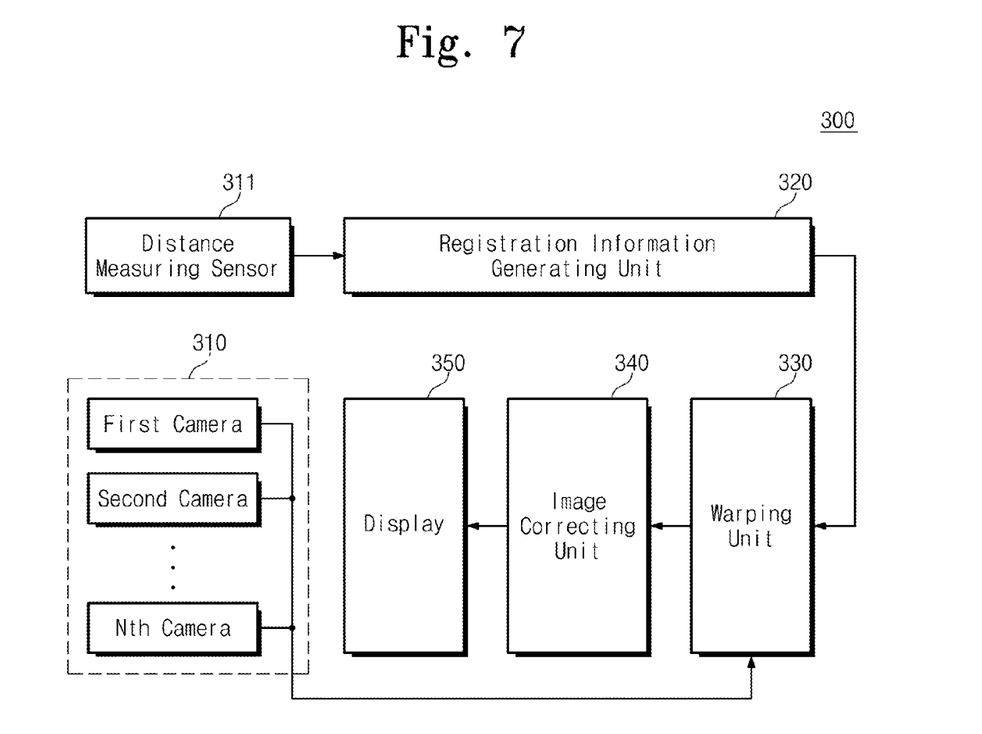
FIG. 7 is a block diagram schematically illustrating an image registration device according to another embodiment of the inventive concept.

FIG. 7 is a block diagram schematically illustrating an image registration device according to another embodiment of the inventive concept. Referring to FIG. 7, an image registration device 300 may include an image input unit 310, a distance measuring sensor 311, a registration information generating unit 320, a warping unit 330, an image correcting unit 340, and a display 350. The image registration device 300 in FIG. 7 may be analogous to that in FIG. 6 except for an image input unit 310, a distance measuring sensor 311, and a warping unit 330.

The image input unit 310 may include at least one image input device. In example embodiments, the inventive concept will be described on the basis of registration on two images input from two image input devices. In example embodiments, a camera may be used as an image input device. However, the inventive concept is not limited thereto. For example, three or more image input devices may be used. Also, a camcorder, a smart phone, and the like may be used as an image input device. An image input from the image input device 310 may be transferred to the warping unit 330.

The distance measuring sensor 311 may measure a photographing distance of a subject. The number of subjects measured by the distance measuring sensor 311 may be various. The distance measuring sensor 311 may send the measured distance information to the registration information generating unit 320.

The warping unit 330 may generate a synthetic image by combining a homography matrix input from the registration information generating unit 320 and an image input from the image input unit 310. The warping unit 330 may perform warping every linear period. The warping unit 330 may use a forward mapping method in which a target image is warped using the homography matrix and then the warped image synthesized with a reference image. Alternatively, the warping unit 330 may use an inverse mapping method for obtaining a location of a target image pixel corresponding to a pixel of a synthetic image.

As described above, the image registration device 300 of the inventive concept may generate distance information using a distance measuring sensor 311. The image registration device 300 may generate overlap information of an image using distance information and location information of a camera. The image registration device 300 may easily determine a matching pair using overlap information of an image. Thus, a calculating amount may be reduced by skipping a feature point extracting operation and a feature vector generating and matching operation. Since a less amount of matching pairs is used at the image registration device 300, it is possible to reduce a time taken to calculate a homography matrix. The image registration device 300 may perform image registration by combining a calculated homography matrix and an input image.

Figure 8:
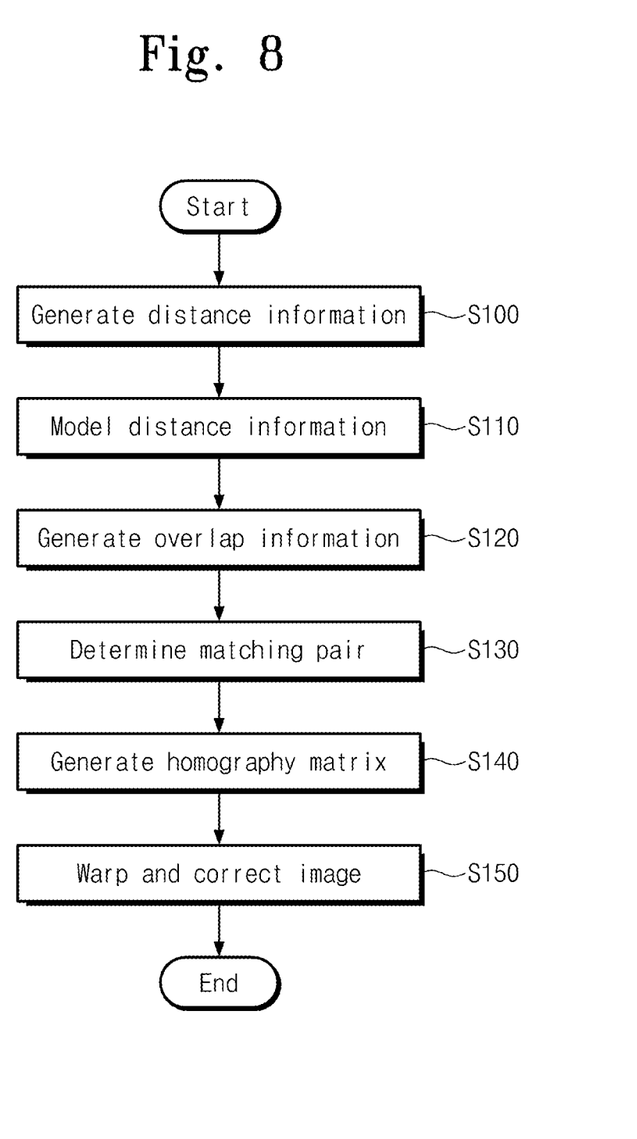
FIG. 8 is a flowchart illustrating an image registration method according to an embodiment of the inventive concept.

FIG. 8 is a flowchart illustrating an image registration method according to an embodiment of the inventive concept. Referring to FIG. 8, in operation S100, distance information on a subject of an input image may be generated. In operation S110, the generated distance information may be modeled through linear approximation. In operation S120, overlap information may be generated based on the modeled distance information.

In operation S130, a matching pair indicating the generated overlap information may be determined. The number of selected matching pairs may not be limited. In operation S140, a homography matrix may be generated according to the determined matching pair. In operation S150, a registered synthetic image may be generated by warping and correcting the input image using the generated homography matrix.

The image registration method of the inventive concept may include generating overlap information of an image using distance information and determining a matching pair easily. Thus, a calculating amount may be reduced by skipping a feature point extracting operation and a feature vector generating and matching operation. Since a less amount of matching pairs is used at a computing operation, it is possible to reduce a time taken to calculate a homography matrix.

The inventive concept may be modified or changed variously. For example, a distance information generator, a distance information modeler, an overlap information generator, a matching pair determiner, and a homography matrix generator may be changed or modified variously according to environment and use.

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. An image registration method comprising:
generating distance information on subjects of an input image;
approximating the distance information;
generating overlap information from the approximated distance information;
determining a matching pair from the overlap information to generate a homography matrix; and
registering an image based on the homography matrix.

2. The image registration method of claim 1, wherein the distance information is generated by an overlap level of the input image.

3. The image registration method of claim 1, wherein the distance information is generated by a photographing distance measured by a distance measuring sensor.

4. The image registration method of claim 1, wherein the distance information is approximated by at least one linear function.

5. The image registration method of claim 1, wherein the overlap information is generated depending upon the modeled distance information and a geometric location condition of the image input unit, the geometric location condition including a separation distance and a viewing angle.

6. The image registration method of claim 1, further comprising:
correcting the registered image.

7. The image registration method of claim 6, wherein the registered image is corrected using a histogram method.

8. The image registration method of claim 6, wherein the registered image is corrected using a graph cut method.

9. The image registration method of claim 6, wherein the corrected image is output to a display.

* * * * *